Patented Oct. 16, 1951

2,571,328

UNITED STATES PATENT OFFICE 2,571,328

METHOD OF CLEANING METAL ARTICLES OF ADHERENT RUBBER AND THE LIKE

John C. Baker, East Cleveland, Ohio, assignor, by mesne assignments, to The Ohio Rubber Company, Willoughby, Ohio, a corporation of Delaware No Drawing. Application December 22, 1947, Serial No. 793,326

16 Claims. (Cl. 51—282)

This invention relates as indicated to a method of cleaning metal articles of adherent rubber and the like, and more particularly to the cleaning of the molds employed in the molding of rubber articles. Such method is also adapted to the reclamation of metal inserts and other parts which have been enclosed in or bonded to bodies of rubber.

In the production of molded rubber goods, a wide variety of types and sizes of metal molds have been employed including molds of iron, steel and aluminum. After a period of use such molds gradually accumulate deposits of carbonaceous material derived from the rubber articles molded therein, and it then becomes necessary to interrupt operations while such deposits are removed. This has always been a messy and time-consuming process. One common method has been to dissolve the deposit by the use of solvents, this having the disadvantage that the resultant material generally closely resembles rubber cement in its properties. Where it is desired to salvage metal cores or elaborate stampings, the rubber has sometimes been removed by burning, the articles being passed through a furnace. Burning rubber, however, gives off a very unpleasant odor, and the heat often damages the metal article to a degree preventing its re-use.

It is therefore a primary object of my invention to provide a method of cleaning metal articles of adherent rubber and related carbonaceous deposits which will be expeditious and at the same time leave the metal surface perfectly clean and ready for re-use.

Another object is to provide such method which will have no deleterious effect upon the metal article.

Other objects and advantages will become apparent as the following description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly, my invention comprises the steps of first subjecting the article to be cleaned to the action of a highly reactive fluorinating agent to render the rubber component or carbonaceous deposit crumbly in texture and then subjecting such article to a mechanical abrading operation to completely remove the adherent rubber or deposit.

While various different apparatus may be employed in carrying out the invention, I have found a closed heat resistant chamber of relatively simple construction to be entirely satisfactory. Such chamber or "furnace" may desirably be of steel and provided with shelves or brackets to support a plurality of dirty molds therein. The chamber is closed with an air-tight seal and the highly reactive fluorinating agent, such as fluorine gas, is then introduced therein. Such gas will preferably be caused to circulate throughout the chamber either by agitation or by positively circulating the gas through the chamber by introducing the same at one end and withdrawing it at the other. In some instances it may be desirable preliminarily to evacuate the chamber prior to the introduction of the fluorine gas therein.

The reaction between the fluorine and the deposit on the molds is exothermic and quite rapid. To prevent the development of too much heat and moderate the rapidity of the reaction an inert gas such as nitrogen may be introduced and intermingled with the fluorine. It is thus possible to regulate the reaction so as to quickly obtain the desired decomposition of the deposit without producing sufficient heat to damage the molds or other metal articles. To make most efficient use of the rather expensive fluorinating agent a considerable proportion of such diluent may be employed and the chamber or furnace heated electrically or otherwise to a temperature normally ranging from about 150° to about 250° F. Such heating promotes the reaction and will often desirably be employed when fluorinating agents of lesser reactivity are made use of, with or without the use of a diluent inert gas. The deposit is quickly rendered crumbly and susceptible to removal by mechanical abrading.

When such reaction has progressed far enough, the fluorine supply is cut off and the furnace may be flushed out with nitrogen, for example. The furnace is then opened and the molds removed, all such operations preferably being carried out under a large exhaust hood as a safety precaution. While various abrading means may now be employed to remove the deteriorated rubber or carbonaceous deposits, a power driven rotary brush is generally preferred since it is quick acting, will reach hollows and angles in the mold, and leaves the mold surface clean and polished. Abrasive blasts and hand scrubbing are alternative methods. The molds will next be oiled, and are ready for re-use.

While substantially the same method as that described above may be employed to reclaim metal inserts or other metal components of composite rubber and metal articles, it is often preferred to employ a rotary furnace or kiln through which the fluorine is passed and in which the articles are simultaneously tumbled with a suitable abrasive such as steel shot. This has the advantage that as the rubber surface is attacked by the fluorine it is steadily worn away, hastening further deterioration of the underlying rubber. In some cases no further cleaning will be required after discharging the metal parts from the furnace. In other cases, a supplemental brushing step is necessary. Of course, this tumbling operation is not suitable for most types of molds which may be quite large and relatively fragile.

The fluorine forms an impervious fluoride coating on the metal surface which protects it from further attack. This treatment has the further advantage of removing any grease and oil from the metal parts so that, in the case of inserts and the like, there will be no difficulty in obtaining the desired rubber to metal bond, when re-used.

The process of this invention is equally efficacious in the cleaning of molds or parts of adherent natural and synthetic rubber, such as neoprene, as well as the bonding agents commonly employed. The various synthetic elastomers are intended to be included within the meaning of the term "rubber" as used herein and in the claims. The rubber may be either vulcanized or unvulcanized and contain the usual filler and coloring materials. Hard rubber is readily attacked and removed.

In addition to fluorine gas certain other highly reactive fluorinating agents such as chlorine trifluoride may be employed. This latter is a liquid below 11.3° C. and may be stored in a pressure cylinder. It has a freezing point of −83° C. and a density of 1.83 g./ml. Bromine trifluoride may also be used in some applications although the matter of expense must be considered. Various other fluorinating agents may be employed but are not generally as suitable as the examples given above due to high cost and relative slowness of reaction. Some of these other agents are:

| | |
|---|---|
| Iododifluoro benzene | $C_6H_5IF_2$ |
| Antimony pentafluoride | $SbF_5$ |
| Cobalt trifluoride | $CoF_3$ |
| Lead tetrafluoride | $PbF_4$ |

Other fluorine inert gases such as neon may be employed instead of or in addition to nitrogen to dilute the fluorinating agent to control the reaction. When cleaning molds of carbonaceous deposits, there is some advantage in using relatively undiluted fluorine gas as this affords a rapid decomposition or "burning" of such deposits. In the case of composite rubber and metal articles, however, the diluted fluorine embrittles the rubber to such a degree that it may ordinarily be removed simply by tumbling.

Ordinarily, the fluorinating agent employed should be sufficiently effective to disintegrate a thin deposit within one half hour's time and usually five to ten minutes should prove enough. As above explained, however, the time required will depend on several variables, including the size or thickness of the rubber body or deposit, the reactivity of the agent, the amount of diluent employed, and the temperature. The term "abrading" as used herein and in the claims is intended to include brushing, tumbling, scouring, blasting, and similar treatments designed to effect the removal of the deteriorated rubber or deposit.

It will be seen from the foregoing that I have provided a method of cleaning metal molds and of reclaiming metal parts of composite rubber and metal articles which is very expeditious and which will not injure the metal surface. As a result, molds may be kept in use with only brief interruptions for cleaning and expensive metal parts may be salvaged at low cost for re-use.

Other modes of applying the principle of the invention may be employed, change being made as regards the details described, provided the features stated in any of the following claims or the equivalent of such be employed.

I therefore particularly point out and distinctly claim as my invention:

1. The method of cleaning metal articles of adherent rubber and related carbonaceous deposits which comprises rendering such adherent rubber and deposits crumbly by subjecting the same to the action of a fluorinating agent, and thereafter mechanically abrading such deteriorated rubber and deposits to remove them from the metal surface.

2. The method of cleaning metal articles of adherent rubber and related carbonaceous deposits which comprises rendering such adherent rubber and deposits crumbly by subjecting the same to the action of a fluorinating agent, and thereafter tumbling such articles to mechanically abrade the deteriorated rubber and deposits from the metal surface.

3. The method of cleaning metal articles of adherent rubber and related carbonaceous deposits which comprises rendering such adherent rubber and deposits crumbly by subjecting the same to the action of a fluorinating agent, and thereafter brushing such articles to mechanically abrade the deteriorated rubber and deposits from the metal surface.

4. The method of cleaning metal articles of adherent rubber and related carbonaceous deposits which comprises rendering such adherent rubber and deposits crumbly by subjecting the same to the action of a highly reactive fluorinating agent, regulating the action of such agent by the dilutive presence of a selected amount of a fluorine-inert gas, and thereafter mechanically abrading such deteriorated rubber and deposits to remove them from the metal surface.

5. The method of cleaning metal articles of adherent rubber and related carbonaceous deposits which comprises rendering such adherent rubber and deposits crumbly by subjecting the same to the action of a highly reactive gaseous fluorinating agent, regulating the action of such agent by the dilutive presence of a selected amount of a fluorine-inert gas, and thereafter mechanically abrading such deteriorated rubber and deposits to remove them from the metal surface.

6. The method of cleaning metal articles of adherent rubber and related carbonaceous deposits which comprises rendering such adherent rubber and deposits crumbly by subjecting the same to the action of fluorine gas, and thereafter mechanically abrading such deteriorated rubber and deposits to remove them from the metal surface.

7. The method of cleaning metal articles of adherent rubber and related carbonaceous deposits which comprises rendering such adherent rubber and deposits crumbly by subjecting the same to the action of fluorine gas, regulating the action of such gas by the dilutive presence of a selected amount of a fluorine-inert gas, and thereafter mechanically abrading such deteriorated rubber and deposits to remove them from the metal surface.

8. The method of cleaning metal articles of adherent rubber and related carbonaceous deposits which comprises rendering such adherent rubber and deposits crumbly by subjecting the same to the action of fluorine gas, regulating the action of such gas by the dilutive presence of a selected amount of nitrogen, and thereafter mechanically abrading such deteriorated rubber and deposits to remove them from the metal surface.

9. The method of cleaning metal articles of adherent rubber and related carbonaceous deposits which comprises rendering such adherent rubber and deposits crumbly by subjecting the same to the action of fluorine gas, heating such articles to from about 150° to about 250° F. in the presence of such gas, and thereafter mechanically abrading such deteriorated rubber and deposits to remove them from the metal surface.

10. The method of cleaning metal articles of adherent rubber and related carbonaceous deposits which comprises rendering such adherent rubber and deposits crumbly by subjecting the same to the action of fluorine gas, heating such articles to from about 150° to about 250° F. in the presence of such gas, regulating the action of such gas by the dilutive presence of a selected amount of a fluorine-inert gas, and thereafter mechanically abrading such deteriorated rubber and deposits to remove them from the metal surface.

11. The method of cleaning metal articles of adherent rubber and related carbonaceous deposits which comprises rendering such adherent rubber and deposits crumbly by subjecting the same to the action of fluorine gas, and thereafter tumbling such articles to mechanically abrade the deteriorated rubber and deposits from the metal surface.

12. The method of cleaning metal articles of adherent rubber and related carbonaceous deposits which comprises rendering such adherent rubber and deposits crumbly by subjecting the same to the action of fluorine gas, and thereafter brushing such articles to mechanically abrade the deteriorated rubber and deposits from the metal surface.

13. The method of cleaning metal articles of adherent rubber and related carbonaceous deposits which comprises rendering such adherent rubber and deposits crumbly by subjecting the same to the action of chlorine tri-fluoride, and thereafter mechanically abrading such deteriorated rubber and deposits from the metal surface.

14. The method of cleaning metal articles of adherent rubber and related carbonaceous deposits which comprises rendering such adherent rubber and deposits crumbly by subjecting the same to the action of chlorine tri-fluoride, and thereafter tumbling such articles to mechanically abrade the deteriorated rubber and deposits from the metal surface.

15. The method of cleaning metal articles of adherent rubber and related carbonaceous deposits which comprises rendering such adherent rubber and deposits crumbly by subjecting the same to the action of chlorine tri-fluoride and thereafter brushing such articles to mechanically abrade the deteriorated rubber and deposits from the metal surface.

16. The method of cleaning metal articles of adherent rubber and related carbonaceous deposits which comprises rendering a superficial portion of such adherent rubber and deposits crumbly by subjecting the same to the action of a fluorinating agent, then mechanically abrading such superficial portion of deteriorated rubber and deposits to remove the same, and thereafter subjecting a newly exposed underlying portion of such adherent rubber and deposits to such action and subsequent abrasion progressively to remove such rubber and deposits from the metal surface.

JOHN C. BAKER.

REFERENCES CITED

The following references are of record in the file of this patent:

UNITED STATES PATENTS

| Number | Name | Date |
| --- | --- | --- |
| 2,052,997 | Bezzenberger | Sept. 1, 1936 |
| 2,279,267 | Kremers | Apr. 7, 1942 |
| 2,347,527 | Vanderbilt | Apr. 25, 1944 |